July 17, 1934.   E. J. McEACHRON ET AL   1,966,590
BATTERY CONSTRUCTION
Original Filed July 29, 1927   2 Sheets-Sheet 1
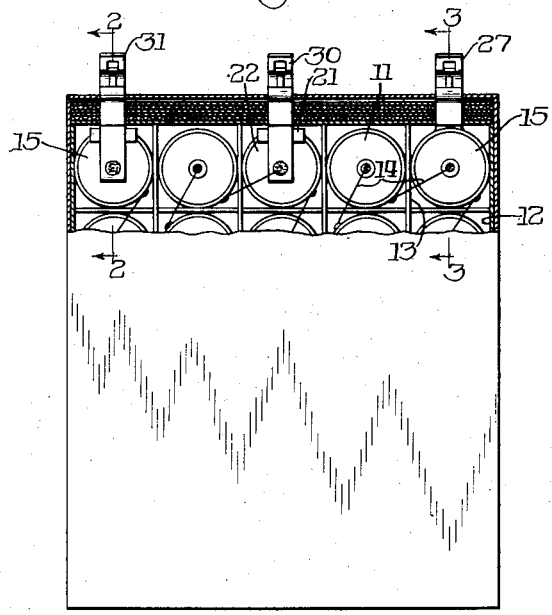
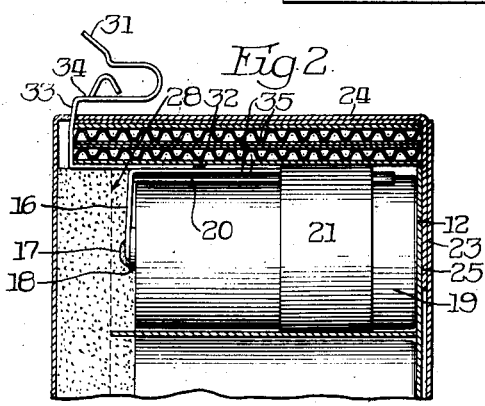
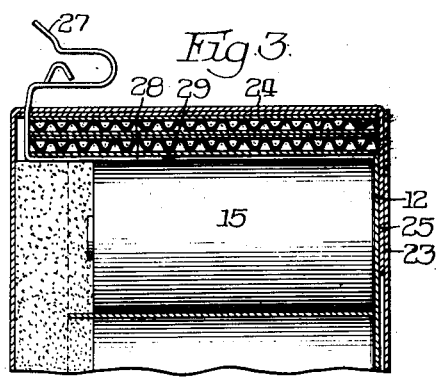
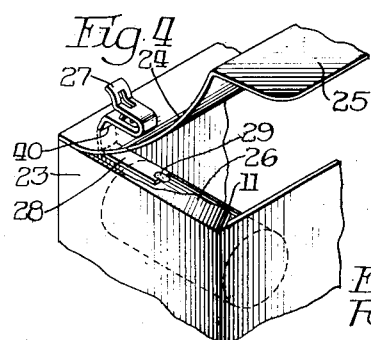
Inventors
Edgar J. McEachron
Reginald S. Johnson
By Wilkinson, Huxley, Byron & Knight
Attys July 17, 1934.  E. J. McEACHRON ET AL  1,966,590
BATTERY CONSTRUCTION
Original Filed July 29, 1927   2 Sheets-Sheet 2
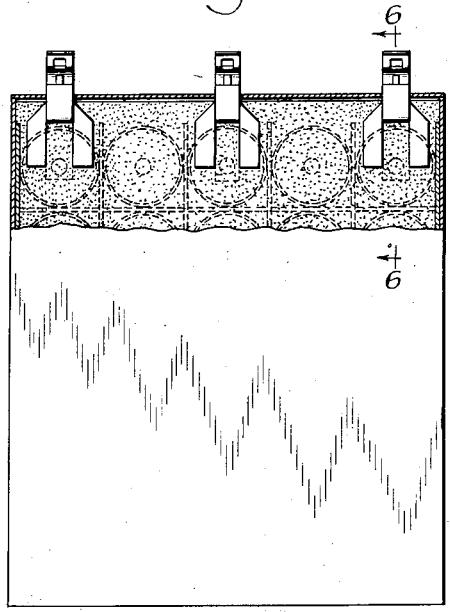
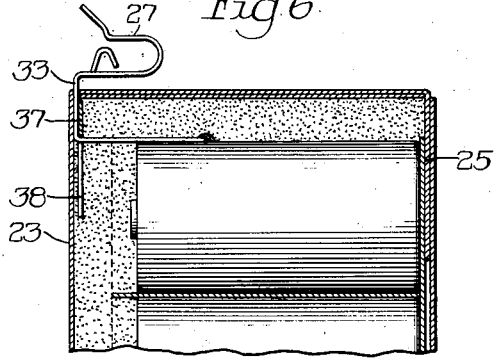
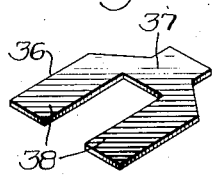
Inventors
Edgar J. McEachron
Reginald S. Johnson
By Wilkinson, Huxley, Byron, & Knight
Attys Patented July 17, 1934

1,966,590

UNITED STATES PATENT OFFICE 1,966,590

BATTERY CONSTRUCTION

Edgar J. McEachron and Reginald S. Johnson, Wausau, Wis., assignors to Marathon Battery Company, Wausau, Wis., a corporation of Wisconsin Original application July 29, 1927, Serial No. 209,234, now Patent No. 1,898,377, dated February 21, 1933. Divided and this application February 5, 1932, Serial No. 591,000

15 Claims. (Cl. 136—109)

This invention relates to a new and improved battery construction and more particularly to a construction of multiple cell batteries in which the cells are located horizontally in a casing.

This application is a division of applicants' co-pending application Serial No. 209,234, filed July 29, 1927, entitled "Battery construction" (now Patent No. 1,898,377, dated February 21, 1933).

It has been customary heretofore to make up multiple cell batteries by placing the cells vertically in a casing provided with an egg crate structure to separate the cells and maintain them in proper relation. After the cells are electrically connected the top of the battery assembly is sealed with a pitchy sealing material. Due to a desire to produce a battery which will take up less table or floor space, it has become the practice to turn these battery assemblies on edge and provide them with terminals extending from the upper face. In this position the cells are horizontal, and it has been customary to provide a second seal of pitchy material on the upper face of the assembly overlying the topmost row of horizontally extending cells.

It is an object of the present invention to provide a new and improved battery of the type known as a vertical battery and to provide a new and improved battery construction.

It is a further object to provide a battery which utilizes an outer carton or case which may be of the collapsible type and which is less expensive than the solid, rigid outer casing as now generally used.

It is an additional object to provide a construction in which the top of the battery as assembled may be closed without the necessity of a second pitchy seal or the like.

It is a further object to provide a battery assembly in which the terminals may be inserted through the upper portion of the enclosing casing and secured to the cells in the casing without large perforations or openings in the upper casing wall.

Other and further objects will appear as the description proceeds.

We have illustrated in the accompanying drawings certain preferred embodiments of our invention, in which—

Figure 1 is a face view of one form of construction partly broken away to show the interior structure;

Figure 2 is a fragmentary section taken on line 2—2 of Figure 1;

Figure 3 is a similar section taken on line 3—3 of Figure 1;

Figure 4 is a fragmentary perspective showing a step in the assembly;

Figure 5 is a view similar to Figure 1, showing a modified form of construction;

Figure 6 is a section taken on line 6—6 of Figure 5; and

Figure 7 is a perspective view of a protective member.

Referring particularly to Figures 1 to 3, the battery comprises a plurality of cells 11 which are placed in an inner casing 12 and separated and held in position by an egg crate structure 13. The cells 11 are electrically connected by means of wires 14.

It will be understood that in the normal assembly the inner casing 12 will be placed horizontally and the cells slipped into place extending vertically. One of the end cells 15 is provided with a member 16, as best shown in Figure 2, this member preferably consisting of a brass strip which is soldered at 17 to a cap 18 secured to the end of the carbon pencil located in the cell. The strip 16 extends up and along the side of the cell and is insulated therefrom by a strip 20 of any insulating material, such for example, as waxed pasteboard or the like. The end of the strip 16 is held down by means of a wrapping 21 of electrician's tape or similar material which also serves to retain in place the insulating material 20. If more than two terminals are to be provided for the finished battery, additional cells such as 22 of Figure 1, may be equipped similarly to cell 15. These cells are provided in this manner before they are inserted in the inner casing. No terminals are secured to the cells or to the strip 16 at this time in the preferred method of assembly.

The upper portion of the assembly is next filled with the usual seal of pitchy material. The outer casing which preferably is in the form of a collapsible carton, is next assembled and opened to receive the inner casing. Its lower end may be permanently closed by gluing the flap in place. The upper end is left open. The upper side of the inner casing, which is the side adjacent the cells 15 and 22, is now broken away and removed. The inner casing is then slipped into the outer casing and assumes the position shown in the drawings. Figure 4 shows the outer casing 23 provided with the cover portion 24 having the flap 25 and also provided with end flaps 26. The end flap 26 in Figure 4 has been broken away in order to show the method of assembly.

The cover portion 24 is provided with narrow slits 40 and through such slit the spring terminal 27 has its lower portion inserted. Its horizontal portion 28 is placed in contact with the cell 11 and is soldered to the cell as shown at 29. In a similar manner the terminals 30 and 31 are inserted through the slits in the cover portion and are soldered at 32 to the strips 16, as shown in Figure 2.

As shown in Figures 2 and 3, the terminals are provided with the lower horizontal portions 28, with the intermediate substantially vertical portions 33 and with upper horizontal portions 34. After the terminals have been secured in place the upper portion of the outer casing may be closed by placing therein one or more strips of corrugated board 35 or other similar material. The flap 25 is then slipped down between the inner casing 12 and the outer carton 23, and secured in place by a suitable adhesive. This serves to complete the assembly of the battery.

The form of assembly shown in Figures 5 and 6 differs from that of Figures 1 to 3 solely in the filling of the upper portion of the outer casing. After the terminals have been inserted through the cover and secured to the cells or strip 16, the protecting members 36, which may be formed of waxed cardboard, are slipped in place over each terminal. These members 36 are provided with portions 37 which extend adjacent the vertical portions 33 of the terminal and the legs 38 which fit down upon either side of the terminal, and thus maintain the members 36 in position. The upper portion of the outer casing 23 is then filled with a pitchy seal 39 similar to that placed in the inner casing before the assembly of the inner casing in the outer casing. The members 36 prevent the terminals from adhering to the seal and the terminals do not pass through the seal but around an edge thereof between the outer casing and the protecting members 36. The top portion 24 of the outer casing is then bent down and the flap 25 inserted and sealed in place in the same manner as previously described. This form of construction is slightly more expensive than the form in which the upper portion is merely filled with the corrugated board or similar material.

It will be noted that in both of these forms of construction by our preferred method of assembly the terminals are inserted through narrow slits in the cover and therefore no portions of the contents of the carton are visible. If the terminals were secured before the cell assembly was placed in the outer carton, it would be necessary to have comparatively large openings in the cover for the terminals to pass through and in this case it would be practically necessary to use the pitchy seal construction of Figures 5 and 6 in all cases. This method of assembly reduces assembly costs and enables collapsible cartons, which may be cheaply made of relatively light material to be used. The invention therefore very materially reduces the cost of producing batteries of this type and affords a highly efficient construction.

While we have shown certain preferred forms of construction, it is to be understood that we contemplate such changes and modifications as come within the spirit and scope of the appended claims.

We claim:

1. A battery construction comprising a plurality of electrically-connected cells, an inner-supporting construction holding the cells in horizontal position, an outer case housing the inner construction on all sides, said outer case consisting of a collapsible one-piece carton, spring-clip terminals having substantially horizontal portions located above the carton, substantially vertical portions extending through slits in the carton of size and shape only sufficient to accommodate said vertical portion and substantially horizontal portions secured within the carton and a board-like filling strip inside the top of the carton and between the upper and lower substantially horizontal portions of the spring clips.

2. A battery construction comprising a plurality of electrically-connected cells, an inner-supporting construction holding the cells in horizontal position, an outer case housing the inner construction on all sides, said outer case consisting of a collapsible one-piece carton, spring-clip terminals having substantially horizontal portions located above the carton, substantially vertical portions extending through slits in the carton of size and shape only sufficient to accommodate said vertical portion and substantially horizontal portions secured within the carton, and a board-like filling strip inside the top of the carton and between the upper and lower substantially horizontal portions of the spring clips, the substantially vertical portions of the spring clips extending by an edge of the filling material.

3. A battery construction comprising a plurality of cells, an inner-supporting construction holding the cells in horizontal position, an outer case housing the inner construction, terminals extending upwardly from certain of the cells adjacent a lateral wall of the outer case, a pitchy seal filling the upper portion of the outer case, and protective means between the terminals and the edges of the pitchy seal, said means preventing adhesion of the terminals to the sealing material.

4. A battery construction comprising a plurality of cells, an inner-supporting construction holding the cells in horizontal position, an outer case housing the inner construction, terminals extending upwardly from certain of the cells adjacent a lateral wall of the outer case, a pitchy seal filling the upper portion of the outer case, and protective waxed-cardboard members between the terminals and the edges of the pitchy seal, said members preventing adhesion of the terminals to the sealing material.

5. A battery construction comprising a plurality of cells, an inner-supporting construction holding the cells in horizontal position, an outer case housing the inner construction on all sides, said outer case consisting of a one-piece collapsible carton, spring-clip terminals having substantially horizontal portions located above the carton, substantially vertical portions extending through slits in the carton of a size and shape only sufficient to accommodate said vertical portion, and horizontal portions secured within said carton and a filling material occupying the space between said horizontal portions and being free from imbedding association with said vertical portions.

6. A battery of the character described, comprising; an inner construction including a supporting container and a plurality of electrically-connected cells; a flexible casing entirely enclosing said inner construction and having slits in one wall thereof; spring-clip terminals extending through said slits and electrically connected to certain of said cells; and means securing said terminals to their associated cells, respectively, by direct fixation to the sides of said cells in such manner that each terminal is solely and completely supported by its associated cell and is devoid of other sustaining support; the slits in said casing being of size and shape substantially the same as the shanks of said spring-clip terminals whereby a snug, closing fit is provided by said casing around the shanks of said terminals.

7. In a battery of the character described, the combination of an inner construction comprising a plurality of cells and a supporting member enclosing and holding said cells in horizontal position, an outer casing for said inner construction comprising a carton of relatively flexible material having a hinge top for enclosing said inner construction, said hinge top having slits therethrough for accommodating spring-clip terminals connected electrically to certain of said cells and extending through said top, said slits being of the same shape and of substantially the same size as the shanks of said spring-clip terminals, whereby a snug, closing fit is provided by said top around the shanks of said spring-clip terminals.

8. A battery of the character described embodying in its construction; a cell, said cell comprising a can, constituting the negative pole, and a positive pole in said can having a relatively small exposed portion; a conducting element constituting a terminal for said battery connected to the exposed portion of said positive pole and having a portion extending along said can; insulating means between said can and terminal portion and means embracing said terminal portion and can for affixing said conducting element to said can, whereby to prevent the transmission of strains from the wire affixing end of said terminal to the connection with said positive pole.

9. For use in a battery construction comprising a plurality of electrically-connected cells, a cell and terminal unit, comprising a cell adapted to be disposed horizontally in the battery construction and having a positive pole with a relatively small exposed portion; a metallic terminal member having one end connected to the exposed portion of said positive pole, its opposite end extended and fashioned to receive a conducting wire, and its intermediate portion positioned in supporting engagement against the side of said cell; insulation between the side wall of said cell and said member; and a strap-like element embracing said intermediate portion and said cell, binding said member for support by said cell so as to avoid the transmission of strains from the wire receiving end of said member to said positive pole connection.

10. A dry battery construction comprising an inner casing having a plurality of cell compartments; a plurality of electrically-connected cells mounted in said compartments and having positive poles with relatively small exposed portions; and a relatively flexible one-piece casing having a hinge cover for receiving endwise, said inner casing and cells, whereby said cells are disposed horizontally; terminal connectors for said battery extending through narrow slits in said cover of said one-piece casing including a positive terminal connected to the exposed portion of the positive pole of one of said cells and having its intermediate portion positioned in supporting engagement against, and insulated from, the side of its associated cell; and a strap-like element embracing said intermediate portion and its associated cell serving to bind said terminal member for support by said cell so as to avoid the transmission of strains from the end of said terminal to its connection with said positive pole.

11. A dry battery construction comprising an inner casing having a plurality of cell compartments; a plurality of electrically-connected cells mounted in said compartments and having positive poles with relatively small exposed portions; and a relatively flexible one-piece casing having a hinge cover for receiving endwise, said inner casing and cells, whereby said cells are disposed horizontally; terminal connectors for said battery extending through narrow slits in said cover of said one-piece casing including a positive terminal connected to the exposed portion of the positive pole of one of said cells and having its intermediate portion positioned in supporting engagement against, and insulated from the side of its associated cell; and a strap-like element embracing said intermediate portion and its associated cell serving to bind said terminal member for support by said cell so as to avoid the transmission of strains from the end of said terminal to its connection with said positive pole; and means constituting filling material within said one-piece casing between the cover thereof and the top row of said cells.

12. In a battery of the character described, the combination of a plurality of horizontally-arranged cells each having a positive pole with a relatively small exposed portion; an inner supporting casing for said cells having a portion of its top wall removed to provide access to a portion of the side of one of the uppermost of said cells; insulation on the accessible portion of said cell; and a terminal member connected to the relatively small exposed portion of the positive pole of said cell and having its intermediate portion positioned against the side of said cell in contact with said insulation; and a strap-like element embracing said cell and said intermediate portion of said terminal member, for securing said terminal member in supported relationship on the side of said cell and independently of its connection with said positive pole.

13. In a battery of the character described, the combination of a plurality of horizontally-arranged cells each having a positive pole with a relatively small exposed portion; an inner supporting casing for said cells having a portion of its top wall removed to provide access to a portion of the side of one of the uppermost of said cells; insulation on the accessible portion of said cell; and a terminal member connected to the relatively small exposed portion of the positive pole of said cell and having its intermediate portion positioned against the side of said cell in contact with said insulation; and a strap-like element embracing said cell and said intermediate portion of said terminal member, for securing said terminal member in supported relationship on the side of said cell and independently of its connection with said positive pole; and, an outer casing for enclosing on all sides said inner casing and cells, provided with a slit in the top wall thereof; said terminal member being extended and projected through said slit.

14. In a battery of the character described, the combination of a plurality of horizontally-arranged cells each having a positive pole with a relatively small exposed portion, an inner supporting casing for said cells having portions of its top wall removed to expose portions of the sides of certain of the uppermost of said cells; insulation on the exposed portion of one of said cells;

a terminal member connected to the relatively small exposed portion of the positive pole of said insulated cell and having its intermediate portion positioned against the side of said cell in contact with said insulation; a strap-like element embracing said cell and said intermediate portion of said terminal member for securing said terminal member in supported relationship on the side of said cell and independently of its connection with said positive pole; and a negative terminal member electrically connected to, and mechanically supported on the exposed portion of another of said cells.

15. In a battery of the character described, the combination of a plurality of horizontally-arranged cells each having a positive pole with a relatively small exposed portion, an inner supporting casing for said cells having portions of its top wall removed to expose a portion of the sides of certain of the uppermost of said cells; insulation on the exposed portion of one of said cells; a terminal member connected to the relatively small exposed portion of the positive pole of said insulated cell and having its intermediate portion positioned against the side of said cell in contact with said insulation; a strap-like element embracing said cell and said intermediate portion of said terminal member for securing said terminal member in supported relationship on the side of said cell and independently of its connection with said positive pole; a negative terminal member electrically connected to, and mechanically supported on the exposed portion of another of said cells; and, an outer casing for enclosing, said inner casing and cells, provided with slits in the top wall thereof; said terminal members being extended and projected through said slits.

EDGAR J. McEACHRON.
REGINALD S. JOHNSON.